(12) United States Patent
Raz et al.

(10) Patent No.: US 7,216,366 B1
(45) Date of Patent: May 8, 2007

(54) STORAGE BASED APPARATUS FOR ANTIVIRUS

(75) Inventors: Yoav Raz, Newton, MA (US); Steven M. Blumenau, Holliston, MA (US); Michel F. Fisher, Natick, MA (US); David C. Butchart, Sammamish, WA (US)

(73) Assignee: EMC Corporation, Hopkinton, MA (US)

( * ) Notice: Subject to any disclaimer, the term of this patent is extended or adjusted under 35 U.S.C. 154(b) by 858 days.

(21) Appl. No.: 09/715,643

(22) Filed: Nov. 17, 2000

(51) Int. Cl.
*G06F 21/06* (2006.01)
(52) U.S. Cl. .......................... 726/24; 726/22
(58) Field of Classification Search ............. 714/48; 713/188; 726/24; 76/24
See application file for complete search history.

(56) References Cited

U.S. PATENT DOCUMENTS

| 5,206,939 | A | | 4/1993 | Yanai et al. |
| 5,319,776 | A | | 6/1994 | Hile et al. |
| 5,778,394 | A | | 7/1998 | Galtzur et al. |
| 5,845,147 | A | | 12/1998 | Vishlitzky et al. |
| 5,857,208 | A | | 1/1999 | Ofek |
| 6,006,329 | A | * | 12/1999 | Chi .............................. 713/200 |
| 6,021,510 | A | * | 2/2000 | Nachenberg ................. 714/38 |
| 6,088,803 | A | * | 7/2000 | Tso et al. ..................... 713/201 |
| 6,094,731 | A | * | 7/2000 | Waldin et al. ................ 714/38 |
| 6,338,141 | B1 | * | 1/2002 | Wells ........................... 713/200 |
| 6,697,950 | B1 | * | 2/2004 | Ko ............................... 726/24 |

OTHER PUBLICATIONS

Frisch, Aeleen; Essential System Administration; Dec. 1995, O'Reilly & Associates, Inc.; 2nd Edition; pp. 23-66, 199-272, and 393-466.*
Kim et al.; "The Design and Implementation of Tripwire: A File System Integrity Checker"; Feb. 23, 1995; pp. 1-18.*
Stang, David J.; "Comparison: Products to Detect Changes to Programs"; 1991; National Computer Security Association; pp. 1-25.*
Kleimola, Johannes; "Experimenting with countermeasures: Appendix C: Tripwire"; 1999; Tripwire Security Systems, Inc.; pp. 1-3.*
Frisch, AEleen; Essential System Administration; Dec. 1995; O'Reilly; 2nd Edition; Chapter 13.*

* cited by examiner

*Primary Examiner*—Gilberto Barrón
*Assistant Examiner*—Jung Kim
(74) *Attorney, Agent, or Firm*—Muirhead & Saturnelli, LLC

(57) ABSTRACT

Detecting computer viruses includes providing a disk space having at least a portion that is partitioned into separate segments, each segment being accessed by at least one of a plurality of hosts. A first one of the segments is accessed using a different file system than a second one of the segments. An antivirus unit scans at least part of the disk space for viruses. The part of the disk space that is scanned by the antivirus unit includes at least some parts of the first and second segments. The first and second segments may correspond to different physical portions of the disk space. The first and second segments may or may not overlap. The first and second segments may correspond to logical entities. Part of the disk space that is scanned by the antivirus unit may correspond to particular types of files stored in the disk space. The disk space that is scanned by the antivirus unit may correspond to files that have been modified since a previous virus scan.

43 Claims, 5 Drawing Sheets

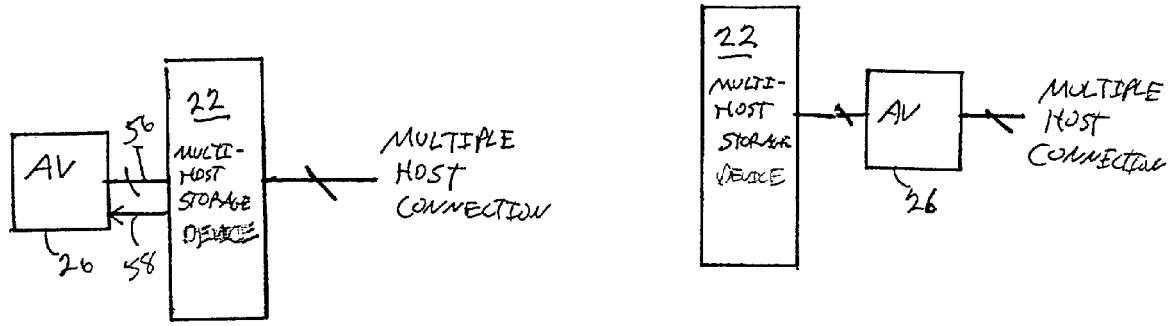
FIG. 4A
FIG. 4B
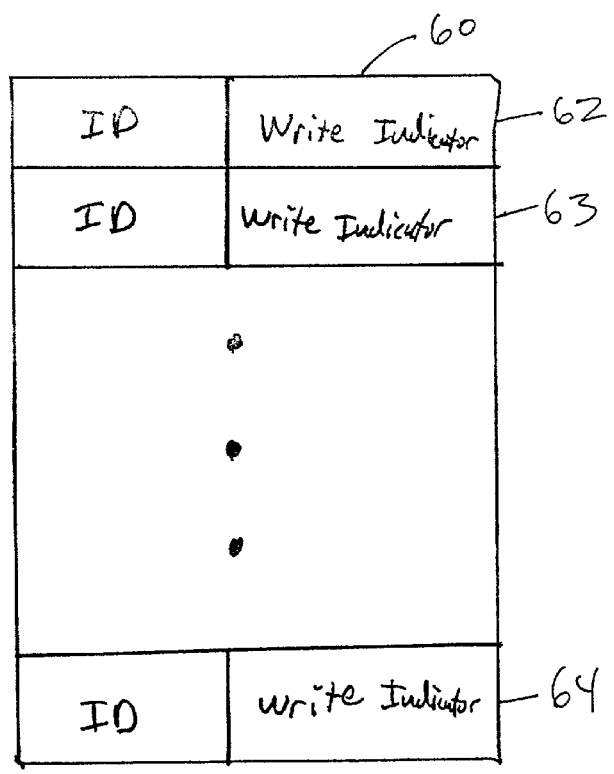
FIG. 5

STORAGE BASED APPARATUS FOR ANTIVIRUS

BACKGROUND OF THE INVENTION

1. Technical Field

This application relates to computer storage devices, and more particularly to inhibiting viruses in computer storage devices.

2. Description of Related Art

A computer system may be attacked by so-called "viruses", which, in many instances, contain code that adversely affects operation of the computer system. Although viruses may exist as stand-alone data files, viruses may also be stored as part of an existing file and are sometimes hidden as seemingly innocuous parts of the file. Thus, a computer system may be infected with a virus by modifying a small portion of a file that is otherwise used for conventional operations unrelated to the virus. When the file is subsequently accessed, the virus may be activated and may cause damage to other parts of the computer system by, for example, replicating itself and/or destroying portions of other files on the computer system.

Antivirus software is provided by a number of commercial vendors to detect viruses on a computer system and, in some instances, remove the offending viruses. Most antivirus software works by scanning individual files to search for suspect patterns of known viruses. Thus, as new viruses are created and detected by the makers of antivirus software, the antivirus software is updated to take into account these new viruses and detect the corresponding patterns.

In many instances, commercially-available antivirus software is configured to operate on a single user computer. The antivirus software may run each time the computer is booted up and may scan each file for suspect patterns. However, it may be desirable to run antivirus software for one or more host processors that store and retrieve data using a multihost storage device containing a plurality of host interface units, disk drives, and disk interface units. Such multihost storage devices are provided, for example, by EMC Corporation of Hopkinton, Mass. and disclosed in U.S. Pat. No. 5,206,939 to Yanai et al, U.S. Pat. No. 5,778,394 to Galtzur et al, U.S. Pat. No. 5,845,147 to Vishlitzky et al, and U.S. Pat. No. 5,857,208 to Ofek. The hosts access the multihost storage device through a plurality of channels provided therewith. The hosts provide data and access control information through the channels to the multihost storage device and the multihost storage device provides data to the hosts also through the channels. The hosts do not address the disk drives of the multihost storage device directly, but rather, access what appears to the hosts as a plurality of logical disk units. The logical disk units may or may not correspond to the actual disk drives of the multihost storage device.

One way to perform antivirus checking on a multihost storage device is to run conventional single user antivirus software on each of the hosts so that files of the multihost storage device that belong to each host may be separately scanned by each host. However, such an arrangement may not provide for efficient coordination of the antivirus software for the entire multihost storage device. In addition, if one or more of the hosts do not properly run antivirus software, then viruses may exist on the multihost storage device even though other hosts have performed appropriate antivirus checking. In addition, such an arrangement may be inefficient with respect to updating the data base of known viruses when each of the hosts is separately updated with new virus information.

It is thus desirable to be able to run antivirus software for multihost storage devices in an efficient and coordinated manner.

SUMMARY OF THE INVENTION

According to the present invention, detecting computer viruses includes providing a disk space having at least a portion that is partitioned into separate segments, each segment being accessed by at least one of a plurality of hosts, wherein a first one of the segments is accessed using a different file system than a second one of the segments, and an antivirus unit scanning at least part of the disk space for viruses, wherein the part of the disk space that is scanned by the antivirus unit includes at least some parts of the first and second segments. The first and second segments may correspond to different physical portions of the disk space. The first and second segments may or may not overlap. The first and second segments may correspond to logical entities. Part of the disk space that is scanned by the antivirus unit may correspond to particular types of files stored in the disk space. The disk space that is scanned by the antivirus unit may correspond to files that have been modified since a previous virus scan. Detecting computer viruses may also include examining a date of last modification for each of the files and determining which files have been modified since a previous virus scan using the date of last modification for each of the files. Detecting computer viruses may also include, in response to a date of last modification indicating a file has been modified since a previous virus scan, scanning the file for viruses. Detecting computer viruses may also include, in response to date information indicating that a file has not been modified since a previous virus scan, comparing a current size of the file with a previous size of the file determined during the previous virus scan, and in response to the current size being different from the previous size, rescanning the file. Detecting computer viruses may also include implementing at least part of the antivirus unit using stand alone hardware and/or as a process running on at least one of the hosts. Useable areas of the disk space may be partitioned into separate segments. The antivirus unit may scan useable areas of the disk space. The antivirus unit may scan at least part of the disk space independently of any file structures corresponding to the disk space. A particular segment assigned to a first host may be inaccessible to other hosts. All of the segments may be at least readable by the antivirus unit. At least a portion of the antivirus unit may be provided on at least some controllers for disks corresponding to the disk space. The antivirus unit may be provided with file structure information for files stored in the disk space.

According further to the present invention, scanning a storage device for viruses includes performing a first virus scan at a first time and performing a second virus scan at a second time after the first time, wherein for said second virus scan, logical entities having a date of last modification that is after the first time are examined. Performing the second virus scan may include scanning only entities having one of a predetermined set of types. Performing the second virus scan may include, for each of the logical entities having a date of last modification that is prior to the first time, comparing a current size value of the entity with a previous size value of the entity prior to the most previous virus scan, and scanning entities having at least one of: a date of last modification that is after the first time and the current size value that is different than the previous size value. Performing the second virus scan may include, for each of the logical entities having one of a predetermined set of types and having a date of last modification that is prior to the first time, comparing a current size value of the entity with a previous size value of the entity prior to the first time, and scanning entities having one of the predetermined set of types and having at least one of: a date of last modification that is after the first time and the current size value that is different than the previous size value.

According further to the present invention, a computer program product for detecting computer viruses includes means for accessing a disk space having at least a portion that is partitioned into separate segments, each segment being accessed by at least one of a plurality of hosts, wherein a first one of the segments is accessed using a different file system than a second one of the segments, and means for scanning at least part of the disk space for viruses, where the part of the disk space that is scanned includes at least some parts of the first and second segments.

According further to the present invention, a computer program product for scanning a storage device for viruses includes means for performing a first virus scan at a first time, and means for performing a second virus scan at a second time after the first time, wherein for said second virus scan, logical entities having a date of last modification that is after the first time are examined.

According further to the present invention, an antivirus scanning unit includes means for coupling to at least one storage device having at least a portion that is partitioned into separate segments, each segment being accessed by at least one of a plurality of hosts, where a first one of the segments is accessed using a different file system than a second one of the segments and means for scanning at least part the at least one storage device for viruses, wherein the part that is scanned includes at least some parts of the first and second segments. The means for coupling may include means for coupling to only one storage device or to more than one storage device. The antivirus unit may include means for coupling to at least one host. The antivirus unit may be interposed between the at least one storage device and the at least one host. The antivirus unit may be implemented as a process running on the at least one host. The antivirus unit may be implemented using stand alone hardware. At least a portion of the antivirus unit may be provided on at least some controllers for the at least one storage device.

According further to the present invention, an antivirus unit includes means for performing a first virus scan at a first time and means for performing a second virus scan at a second time after the first time, wherein for said second virus scan, logical entities having a date of last modification that is after the first time are examined.

BRIEF DESCRIPTION OF DRAWINGS

FIGS. 4A and 4B illustrate various configurations for coupling an antivirus unit to a multihost storage device according to various aspects of the system described herein.

FIG. 5 illustrates a table used to monitor writing to tracks according to various aspects of the system described herein.

DETAILED DESCRIPTION OF VARIOUS EMBODIMENTS

Figure 1A:
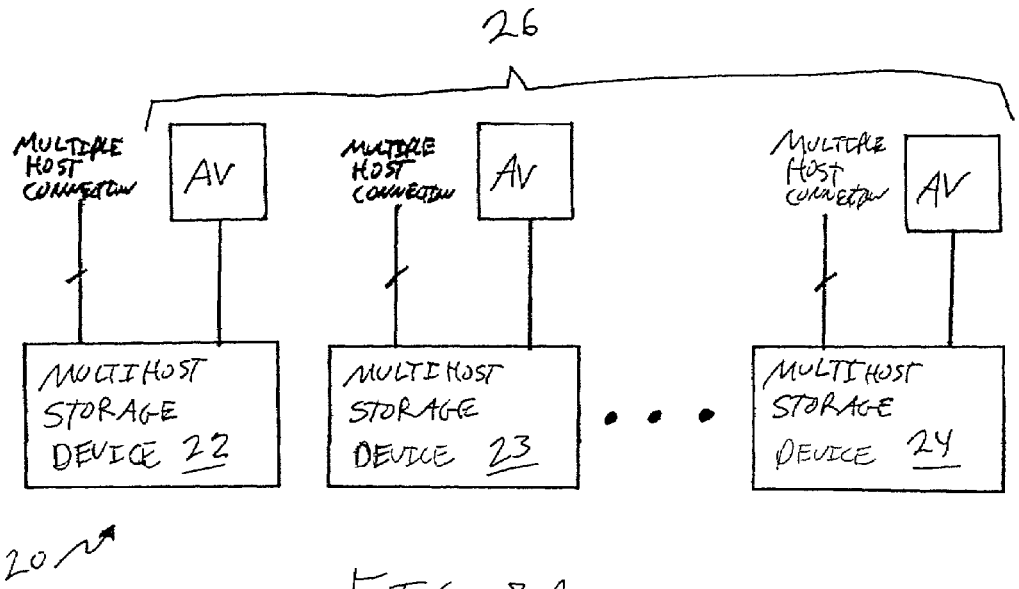
FIGS. 1A and 1B illustrate antivirus units coupled to multihost storage devices according to various aspects of the system described herein.

Referring to FIG. 1A, a system 20 includes a plurality of multihost storage devices 22–24, that are each coupled to a plurality of hosts (not shown) and are each coupled to one of a plurality of antivirus units 26. The multihost storage devices 22–24 may be Symmetrix devices provided by EMC Corporation of Hopkinton, Mass. or may be other storage devices capable of supporting a plurality of hosts. The antivirus units 26 may be implemented using any one of a variety of conventional, off-the-shelf, computer hardware and/or software systems capable of providing the functionality described herein. Thus, it will be appreciated by one of ordinary skill in the art that the antivirus unit 26 may be implemented as a stand alone processor, a process or program running on one or more of the hosts, a distributed program with portions running on different processors, including possible stand alone hardware and/or the hosts, or any combination thereof.

For each of the multihost storage devices 22–24, the corresponding one of the antivirus units 26 handles antivirus scanning and/or recovery for the entire multihost storage device 22–24, including all of the data objects (e.g., files) stored by the collection of hosts connected to each of the multihost storage devices 22–24. In some embodiments, part or all of the functionality of the antivirus units 26 may be provided on some or all of the hosts coupled to the multihost storage devices 22–24.

Figure 1B:
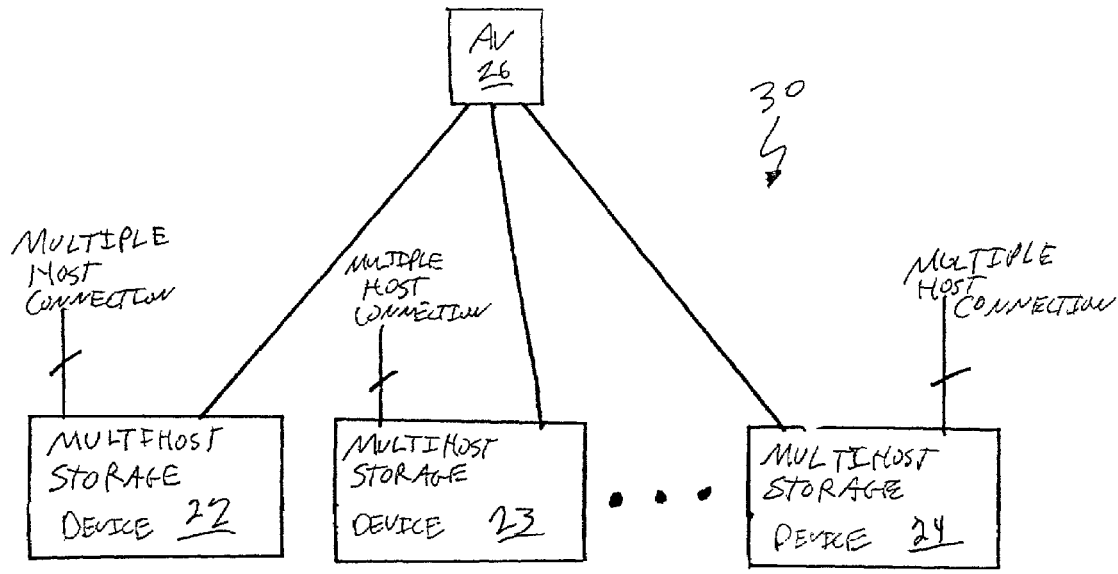

Referring to FIG. 1B, a second system 30 includes the plurality of storage devices 22–24 coupled to the antivirus unit 26 that services all of the storage units 22–24. In the system 30 shown in FIG. 1B, the antivirus unit 26 handles antivirus scanning and/or recovery for the multiple storage devices 22–24 in a manner analogous to the handling provided in the configuration shown in FIG. 1A. Note that systems may be configured with any appropriate combination of the set up shown in FIG. 1A and that shown in FIG. 1B.

Figure 2:
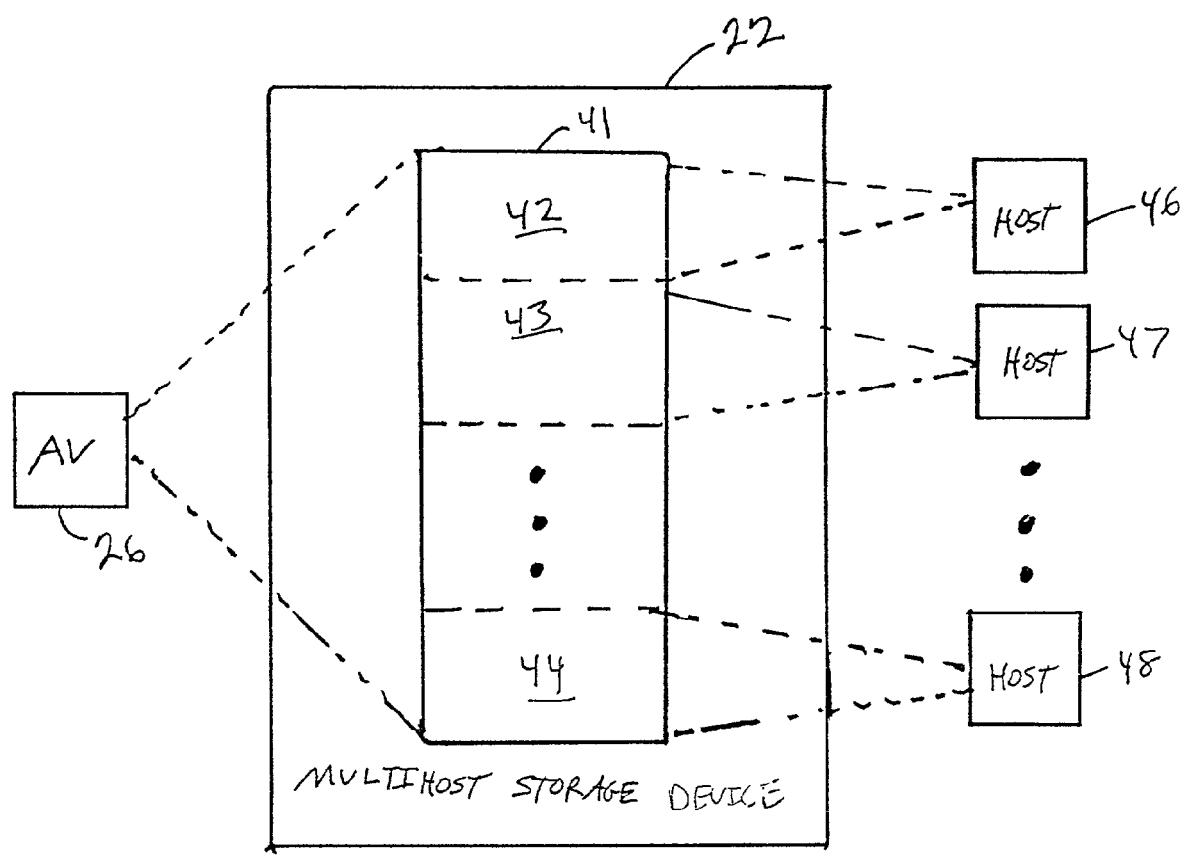
FIG. 2 illustrates memory mapping in a multihost storage device by hosts and an antivirus unit according to various aspects of the system described herein.

Referring to FIG. 2, the storage device 22 is shown as having a memory section 41 that is divided into a plurality of sections 42–44, each of which is used by one of a plurality of hosts 46–48. The memory section 41 may correspond to, for example, disk drive units of the storage device 22. FIG. 2 shows the section 42 being used exclusively by the host 46, the section 43 being used exclusively by the host 47 and the section 44 being used exclusively by the host 48. FIG. 2 illustrates an operative configuration of the Symmetrix storage device provided by EMC Corporation where the memory 41 of the multihost storage device 22, although accessed by multiple hosts, is divided into sections that are exclusively accessed by only one of the hosts 46–48. In other operative configurations of the Symmetrix device, or possibly for other types of multihost storage devices, a portion of the memory 41, including an entire portion, may be shared in some fashion between the hosts 46–48. Such sharing of storage in the multihost storage system 22 may be supported by new operating systems or by enhancements or configuration settings to existing operating systems that may be run on the hosts 46–48.

Also shown in FIG. 2 is a mapping where the antivirus unit 26 accesses all the sections 42–44 of the memory 41 of the multihost storage device 26. Note that, in the case of the Symmetrix product, such a mapping may be possible since the Symmetrix may allow connected devices to access any portion of the memory 41 by specifying a logical disk number, cylinder number, and track number. Thus, for the Symmetrix product, the exclusive access to the sections 42–44 by the hosts 46–48 may be enforced by having the hosts 46–48 specify mutually exclusive combinations of logical disk number, cylinder number, and track number. However, if the antivirus unit 26 is able to specify any logical disk number, cylinder number, and track number, then the antivirus unit 26 may simultaneously access any one of the sections 42–44 even while the hosts 46–48 are also accessing the sections 42–44.

Note that some versions of the Symmetrix product may have provisions for enforcing exclusivity with respect to access of the memory 41. In those cases, it may be necessary to override any exclusive access provisions to provide the mapping shown in FIG. 2. In addition, other multihost storage systems may have different exclusivity rules and processes that need to be addressed in order to allow the antivirus unit 26 access to the same sections 42–44 of the memory 41 as the hosts 46–48.

If the antivirus unit 26 only scans for and reports viruses (without attempting to repair virus-ridden files and/or sections of the memory 41), then the antivirus unit 26 may only read data from the sections 42–44 and thus may not interfere with operation of the host 46–48 even while the hosts are reading and writing data to the sections 42–44. In other embodiments, the antivirus unit 26 may repair/remove files containing viruses. In some embodiments, the antivirus unit 26 may send a signal to an appropriate one of the hosts 46–48 indicating the possible presence of a virus. In some instances, a file read operation by the antivirus unit 26 may be corrupted if the same file is also being simultaneously written to by one of the hosts 46–48. However, such corruption may be dealt with either by having the antivirus unit 26 rescan the file, by ignoring such file corruption, and/or by reporting file corruption as a possible virus that merits further investigation.

The antivirus unit 26 may access files in the sections 42–44 in any one of a variety of conventional manners such as, for example, providing the directories of each of the hosts 46–48 to the antivirus unit 26. Of course, the frequency by which the hosts 46–48 provide directory information to the antivirus unit 26 may be affected by a variety of factors. For example, if the hosts 46–48 provide directory information to the antivirus unit 26 too infrequently, then the antivirus unit 26 may have difficulty accessing files that have been modified after the directory information was provided. However, if the directory information from the hosts 46–48 is provided to the antivirus unit 26 too frequently, then the overhead of performing a directory transfer operation may degrade system performance.

In some embodiments, one or more of the hosts 46–48 may use a different file system than other ones of the hosts 46–48. This may be handled in a very straight-forward manner if the hosts 46–48 access the multihost storage system 22 by specifying disk number, cylinder number, and track number, as with the Symmetrix product. In that case, it is the operating system used by each of the hosts 46–48 that governs the file system used by the hosts 46–48 and how the hosts 46–48 access the sections 42–44. For example, the host 46 may access the section 42 using the NT file system while the host 47 accesses the section 43 using the Unix file system. Thus, when the hosts 46–48 provide directory information to the antivirus unit 26 (as discussed above), some of the information provided may include an identification of the type of file system that is used.

In some embodiments, the antivirus unit 26 detects viruses on a file by file basis since detecting virus patterns may be aided by knowing a file type and structure. Thus, in instances where the sections 42–44 may be accessed by hosts 46–48 using different file systems, the antivirus unit 26 may adapt to each of the different file systems and access individual files for each of the systems in order to scan for viruses. In some embodiments, the antivirus unit 26 may use one particular operating system and may be provided with software for non-native file accesses of files created using different operating systems. Software for allowing a processor running one operating system to access files using a different operating system is provided, for example, by EMC Corporation of Hopkinton, Mass.

Note that it is possible to have the antivirus unit 26 run only when the hosts 46–48 are not accessing the corresponding sections 42–44 when, for example, a particular one of the hosts 46–48 is powered down or otherwise taken off line with respect to the multihost storage system 22. Alternatively, it may be possible to periodically deny access by each of the hosts 46–48 to the respective ones of the sections 42–44 while the antivirus unit 26 is scanning the one of the sections 42–44 for each of the hosts 46–48. However, as discussed above, the antivirus unit 26 may scan the sections 42–44 while the hosts 46–48 are accessing the sections with minimal adverse effects.

The antivirus unit 26 may be implemented using conventional computer hardware and software comparable to software that is currently available for single user computers for scanning files for viruses. The differences in implementation of existing, single user, antivirus software and the software used for the antivirus unit 26 are provided for by the discussion herein.

Note that it is possible to have the antivirus unit 26 scan the entirety of the multihost storage device 22 continuously so that the antivirus unit 26 starts at a particular location in the memory 41 of the multihost storage device 22 and scans for viruses until the starting point is reached, at which time another cycle may begin. However, such scanning may be inefficient for a number of reasons. In the first place, it has been found that viruses are more likely to reside in certain types of files than others. For instance, it is generally considered more likely to find a virus in an executable file than in a data file that does not contain any executable code. Secondly, detecting viruses may involve complex pattern matching that is processor intensive and thus scanning the entire storage device 22 may be impractical. Accordingly, in some embodiments, the antivirus unit 26 may be configured to selectively scan only certain types of files.

The selectively scanned file types may include, for example, executable files and/or files that affect system configuration (e.g., config.sys and autoexec.bat). In addition, in instances where the multihost storage device 22 is used to store Web based applications and/or data, the file types that are scanned may include Java scripts, other Web based interpreted/executed files, Web pages with particular tags (e.g. particular HTML tags), and/or particularly identified data packets (e.g., TCP/IP packets).

In addition, it may be possible to achieve further optimizations by having the antivirus unit 26 scan only files that have been modified since a previous scan. Thus, even files deemed more likely to contain a virus, such as executable files, may not be scanned if the date of last modification of the file is earlier than a previous scan. Note that, in many instances, a virus attack requires modification of an executable file. Thus, if the file is deemed to have no viruses at a particular point in time, and it is not changed after that point in time, then a reasonable assumption might be that the executable file still does not contain viruses.

Note further, however, that a possible virus attack may include modifying the file system to hide any modifications of an executable file by, for example, falsifying an incorrect date of last modification of the file. However, such an attack may be detected by also examining the size of a file. Thus, if it is indicated that a file has not been modified since a previous scan, then the file size should be identical to the previous file size. If it is determined that the file size has changed (even though the file system information indicates that the file has not been modified), then the file is suspect and may be scanned for viruses.

Figure 3:
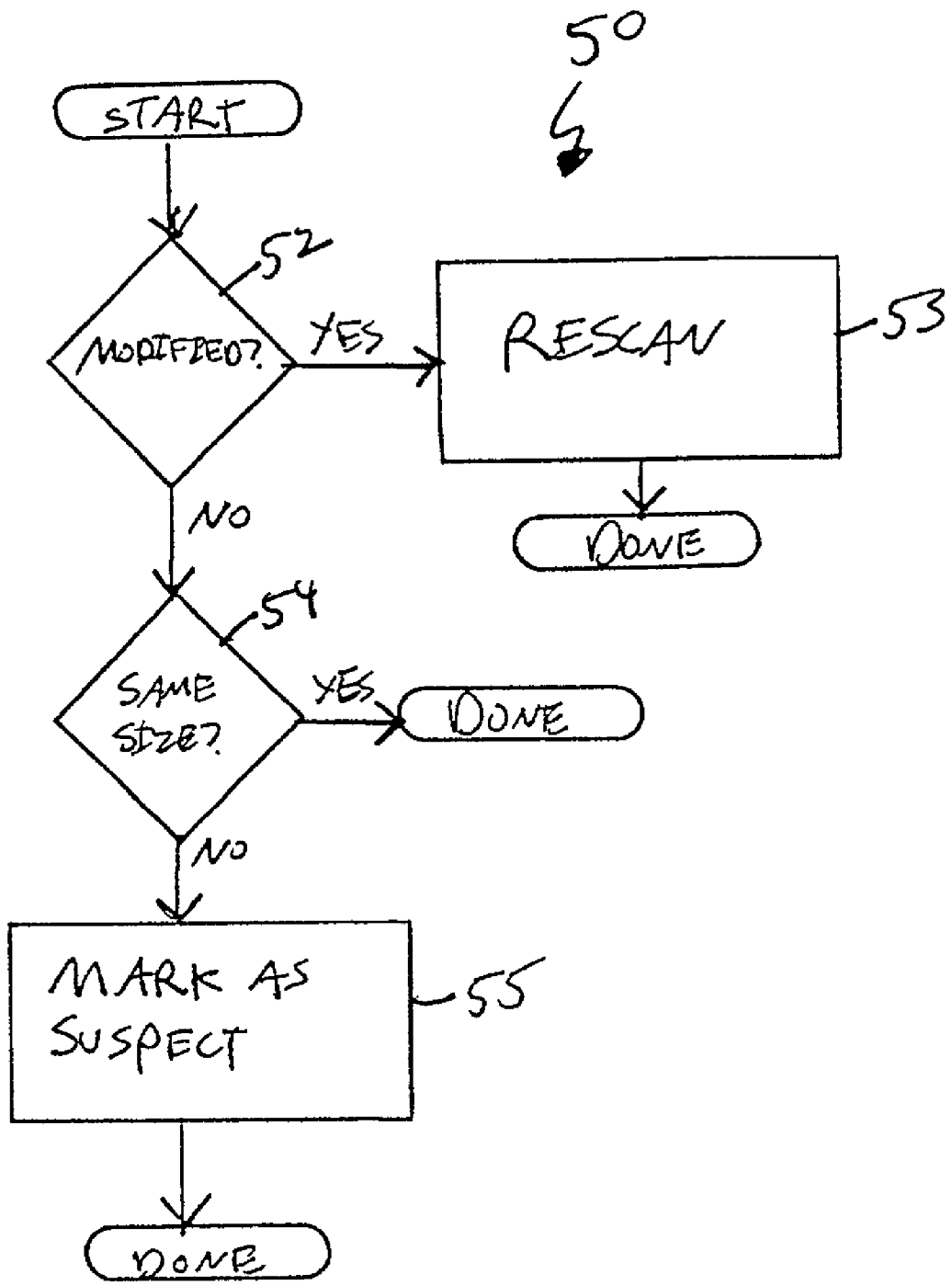
FIG. 3 is a flow chart illustrating steps performed in connection with determining if a file has been modified since a previous virus scan.

Referring to FIG. 3, a flow chart 50 illustrates steps performed in connection with determining whether a file should be marked for scanning for viruses. At a first test step 52, it is determined if a file has been modified since the last time virus scanning was performed. The determination may be made, for example, by examining a date of last modification for the file. Other techniques for making the determination are apparent to one of ordinary skill in the art. If the file has been modified since the previous virus scan, then control passes from the step 52 to a step 53 where the file is marked to be scanned for viruses on the current iteration (i.e., the current virus scan). Following the step 53, processing is complete.

If it is determined at the test step 52 that a file has a date of modification that is before the last virus scan, then control passes from the test step 52 to a test step 54 which determines if the file is the same size as on the previous virus scan. Note that it is possible to store file size, along with the date of the last virus scan, for each of the files. If it is determined at the test step 54 that the file is the same size as on the previous scan, then processing is complete. Otherwise, if the sizes are different, it is possible that the file has been modified with a virus in a way that includes a modification of the date information for the file. In that case, control passes from the test step 54 to a step 55 where a file is marked as a suspect file (i.e., is marked to be scanned for viruses). Following the step 55, processing is complete.

In some embodiments, the storage device may be able to detect modifications to particular tracks of the storage device using a scheme similar to that disclosed, for example, in pending U.S. patent application Ser. No. 09/344,999 filed on Jun. 25, 1999, which is incorporated by reference herein. Such a scheme is also discussed herein in connection with FIG. 5. As set forth above, in some embodiments, the storage device 32 is accessed by specifying a logical disk unit, cylinder number, and track number. Thus, the storage device may detect write operations to tracks of the device. Any files that are stored on the tracks that are written to since a previous virus scan may be deemed suspect and thus may be scanned for viruses.

Referring to FIG. 4A, the antivirus unit 26 is shown as being connected to the multihost storage device 22 by a conventional data line 56 analogous to the connections between the antivirus unit 26 and the multihost storage device 22 shown in previous figures. However, FIG. 4A also shows the antivirus unit 26 being coupled to the multihost storage device 32 via a second line 58 that may provide particular information to the antivirus unit 26, as discussed below.

In the embodiment of FIG. 4A, the multihost storage unit 22 may provide information to the antivirus unit 26 while the second line 58 indicates which of the tracks of the multihost storage device 22 have been accessed for a write operation. The antivirus unit 26 may thus use the track information to determine which of the files on the multihost storage device 22 requires scanning by determining which files reside on tracks that have been written to since the previous scan. Note also that the second line 58 may be used to provide directory information of the hosts to the antivirus unit 26, thus enabling the antivirus unit 26 to access the multihost storage device 22 using the file systems and directory information of each of the hosts. In some embodiments, the information that is provided on the two lines 56, 58 may be multiplexed on a single connection in a conventional manner.

Referring to FIG. 4B, another configuration shows the antivirus unit 26 interposed between the hosts and the multihost storage device 22. In this configuration, commands and data between all of the hosts and the multihost storage device 22 are passed through the antivirus unit 26. When commands and data have passed through by the antivirus unit 26, the fact that the antivirus unit 26 is interposed in the connection is transparent to the hosts and to the multihost storage device 22. However, in the course of passing through commands, the antivirus unit 26 may monitor the commands to detect a write operation being performed. When a write operation is detected, the antivirus unit 26 may note the track on which the write operation took place.

Referring to FIG. 5, a table 60 is shown as containing a plurality of entries 62–64 where each of the entries contains a track I.D. field and a write indicator. The table 60 may be created especially for the purposes discussed herein, may be an other table used for another purpose by the multihost storage device 22, and/or may be a copy of such an other table. Whenever the antivirus unit 26 scans the multihost storage device 22, the write indicators for all of the entries 62–64 are set to false. Then, whenever the antivirus unit 26 detects a write of a track, the particular one of the entries 62–64 having an I.D. field corresponding to the I.D. of the track that is being written to is accessed and the write indicator for the entry is set to true. Thus, on a subsequent virus scan of the multihost storage device 22, it is possible to examine the table 60 to determine which tracks have been affected since the most recent scan and, based on that knowledge, determine which files need to be examined for viruses.

In some instances, all the files associated with a particular track may be rescanned while in other instances it may be possible to determine the particular sectors that have been modified and rescan only the files associated with the particular sectors. In some embodiments, it may be possible for the antivirus unit 26 to effect a download of directory information from the hosts 46–48 when the table 60 is examined in order to be able to accurately map the track information from the table 60 to particular files on the multihost storage device 22. Note that the technique illustrated in connection with FIG. 5 is not necessarily limited to tracks and/or sectors, but may be easily extended for use in connection with any subportions of the multihost storage device 22. Note also that the tracks and/or sectors may or may not correspond to actual tracks and sectors on one of the disk drives of the multihost storage device 22 or may be virtual tracks and/or virtual sectors of the storage device 22.

It may be possible in some instances to scan the multihost storage device 22 for particular patterns corresponding to viruses without regard to the file structure, file system or file types. Of course, such a scan may be very processor intensive since it does not make use of file type or structure information. However, if the antivirus unit 26 is provided with specialized pattern matching hardware, then such a scan may become more efficient. The advantage of scanning the multihost storage device 22 in this manner is that it does not require knowledge of the file systems used by the hosts 46–48 and does not require updated directory information from the hosts. Note that this configuration may take advantage of techniques discussed above for determining which portion(s) of the storage device 22 (e.g., which track and/or sector) have been written to since a previous virus scan.

Figure 6:
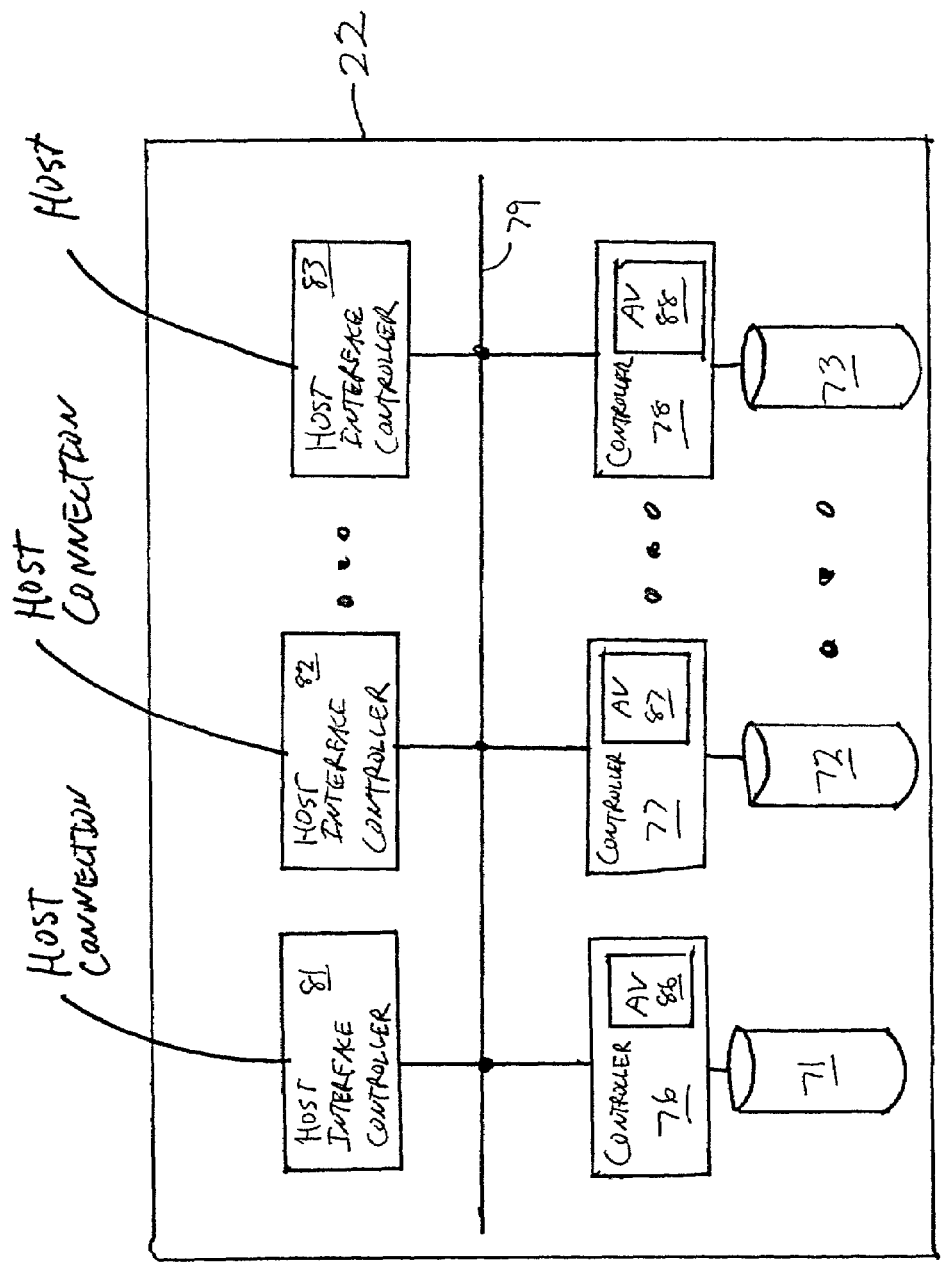
FIG. 6 illustrates a multihost storage device according to various aspects of the system described herein.

Referring to FIG. 6, an embodiment of the multihost storage device 22 is shown in more detail as containing a plurality of disk drives 71–73 and a plurality of corresponding disk drive controllers 76–78 that are coupled to a bus 79 which is coupled to a plurality of host interface controllers 81–83. Each of the disk interface units 76–78 is also shown as having a plurality of corresponding antivirus units 86–88 that run on each of the disk interface units 76–78. Note that, if it is not necessary to have access to the various file systems used by the hosts, as discussed above in connection with various embodiments, then it may be possible to have antivirus capability as part of the disk controller 76–78, either as software that runs on the hardware of the disk controllers 76–78 or as a combination of software/hardware where separate components are dedicated to providing the antivirus functionality described herein. In some embodiments, it may be possible to detect which portion(s) of the disk drives 71–73 have been modified since a previous scan (using, for example, any of the techniques discussed herein adapted for the configuration of FIG. 6) in order to scan only those portions in a subsequent virus detection iteration. In some embodiments, the antivirus units 86–88 may be configured to use some or all hardware that is separate from the hardware of the controllers 76–78.

Alternatively, it may be possible to provide the antivirus units 86–88 with file system information that allows the antivirus units 86–88 to access individual files stored on the disk drives 71–73. The information may include pointers to directories along with file system type information, or may include all the directory and file type information. In these embodiments, it may also be possible to detect which portion(s) of the disk drives 71–73 have been modified (or which files have been accessed/written) since a previous scan (using, for example, any of the techniques discussed herein adapted for the configuration of FIG. 6) in order to scan only those portions (files) in a subsequent virus detection iteration.

Note that, even though the discussion provided herein relates to handling viruses contained in files, it will be apparent to one of ordinary skill in the art that the systems and techniques described herein are extendable to other, more general, types of data objects that may contain viruses.

While the invention has been disclosed in connection with various embodiments, modifications thereon will be readily apparent to those skilled in the art. Accordingly, the spirit and scope of the invention is set forth in the following claims.

What is claimed is:

1. A method of detecting computer viruses, comprising:
providing a disk space having at least a portion that is partitioned into separate segments, each segment being accessed by at least one of a plurality of hosts, wherein a first one of the segments is accessed using a different file system than a second one of the segments;
an antivirus unit, that uses a particular operating system, scanning at least part of the disk space for viruses, wherein the part of the disk space that is scanned by the antivirus unit includes at least some parts of the first and second segments;
the antivirus unit accessing non-native files created using operating systems different from the particular operating system that is used by the antivirus unit in connection with scanning at least parts of the disk space for viruses, wherein said antivirus unit scans at least one of the segments without using file-based information of the particular operating system or of any host having access to said at least one segment;
detecting write operations to tracks of the storage device;
providing, to the antivirus unit by the storage device, information indicating which tracks of the storage device have been accessed for a write operation; and
performing, in accordance with detected write operations, virus scanning on those tracks to which write operations have been directed.

2. A method, according to claim 1, wherein said first and second segments correspond to different physical portions of the disk space.

3. A method, according to claim 2, wherein said first and second segments overlap.

4. A method, according to claim 2, wherein the first and second segments do not overlap.

5. A method, according to claim 1, wherein the first and second segments correspond to logical entities.

6. A method, according to claim 5, wherein said first and second segments overlap.

7. A method, according to claim 5, wherein the first and second segments do not overlap.

8. A method, according to claim 1, further comprising:
implementing at least part of the antivirus unit using stand alone hardware.

9. A method, according to claim 1, further comprising:
implementing at least part of the antivirus unit as a process running on at least one of the hosts.

10. A method, according to claim 1, wherein useable areas of the disk space are partitioned into separate segments.

11. A method, according to claim 1, wherein the antivirus unit scans useable areas of the disk space.

12. A method, according to claim 1, wherein a particular segment assigned to a first host is inaccessible to other hosts.

13. A method, according to claim 12, wherein all of the segments are at least readable by the antivirus unit.

14. A method, according to claim 1, wherein at least a portion of the antivirus unit is provided on at least some controllers for disks corresponding to the disk space.

15. The method of claim 1, wherein the antivirus unit and a first of said plurality of hosts have access to a same segment and access to said same segment by said first host is denied when said same segment is being accessed by said antivirus unit.

16. The method of claim 1, wherein the antivirus unit and a first of said plurality of hosts have access to a same segment and the antivirus unit is allowed to perform virus scanning on said same segment while said same segment is being accessed by said first host.

17. The method of claim 1, wherein the antivirus unit accesses data on the storage device over a first connection and the information being provided on a second connection between said antivirus unit and the storage device.

18. A method of scanning a storage device for viruses, comprising:
performing a first virus scan at a first time; and
performing a second virus scan at a second time after the first time, wherein for said second virus scan, logical entities having a date of last modification that is after the first time are examined and wherein performing said first and second virus scans includes using a particular operating system and accessing non-native files created using operating systems different from the particular operating system, wherein, when performing a virus scan accessing at least one part of the storage device that is also accessible to at least one host, scanning of said at least one part is performed without using file-based information of the particular operating system or of any host having access to said at least one part, and wherein at least one of said performing said first virus scan and said performing said second virus scan includes:

detecting write operations to tracks of the storage device;

providing, by the storage device to an antivirus unit that performs virus scanning, information indicating which tracks of the storage device have been accessed for a write operation; and performing, in accordance with detected write operations, virus scanning on those tracks to which write operations have been directed.

19. The method of claim 18, wherein the antivirus unit accesses data on the storage device over a first connection and the information being provided on a second connection between said antivirus unit and the storage device.

20. A computer program product for detecting computer viruses, comprising:

means for accessing a disk space having at least a portion that is partitioned into separate segments, each segment being accessed by at least one of a plurality of hosts, wherein a first one of the segments is accessed using a different file system than a second one of the segments;

means that uses a particular operating system for scanning at least part of the disk space for viruses, wherein the part of the disk space that is scanned includes at least some parts of the first and second segments; and means for accessing non-native files created using operating systems different from the particular operating system that is used in connection with scanning at least parts of the disk space for viruses, wherein, when performing a virus scan accessing at least one of the segments that is also accessible to at least one of said plurality of hosts, scanning of said at least one segment is performed without using file-based information of the particular operating system or of any host having access to said at least one segment.

21. A computer program product, according to claim 20, wherein said first and second segments correspond to different physical portions of the disk space.

22. A computer program product, according to claim 21, wherein said first and second segments overlap.

23. A computer program product, according to claim 21, wherein the first and second segments do not overlap.

24. A computer program product, according to claim 20, wherein the first and second segments correspond to logical entities.

25. The computer program product of claim 20, wherein said means for accessing non-native files and a first of said plurality of hosts have access to a same segment and access to said same segment by said first host is denied when said same segment is being accessed by said means for accessing non-native files.

26. The computer program product of claim 20, wherein said means for accessing non-native files and a first of said plurality of hosts have access to a same segment and said means for accessing non-native files is allowed to perform virus scanning on said same segment while said same segment is being accessed by said first host.

27. The computer program product of claim 20, wherein said means for accessing non-native files accesses a portion of said disk space using a logical disk unit, a cylinder number and a track number, and the computer program product further comprising:

means for detecting write operations to tracks of the device; and means for performing, in accordance with detected write operations, virus scanning on those tracks to which write operations have been directed.

28. A computer program product for scanning a storage device for viruses, comprising:

means for performing a first virus scan at a first time; and means for performing a second virus scan at a second time after the first time, wherein for said second virus scan, logical entities having a date of last modification that is after the first time are examined and wherein performing said first and second virus scans includes using a particular operating system and accessing non-native files created using operating systems different from the particular operating system, wherein, when performing a virus scan accessing at least one part of the storage device that is also accessible to at least one host, scanning of said at least one part is performed without using file-based information of the particular operating system or of any host having access to said at least one part, wherein at least one of said means for performing said first virus scan and said means for performing said second virus scan include:

means for detecting write operations to tracks of the storage device; and means for performing, in accordance with detected write operations, virus scanning on those tracks to which write operations have been directed.

29. An antivirus scanning unit, comprising:

means for coupling to at least one storage device having at least a portion that is partitioned into separate segments, each segment being accessed by at least one of a plurality of hosts, wherein a first one of the segments is accessed using a different file system than a second one of the segments;

means for using a particular operating system for scanning at least part of the at least one storage device for viruses, wherein the part that is scanned includes at least some parts of the first and second segments; and means for accessing non-native files created using operating systems different from the particular operating system that is used in connection with scanning at least parts of the disk space for viruses, wherein, when performing a virus scan accessing at least one of the segments that is also accessible to at least one of said plurality of hosts, scanning of the at least one segment is performed without using file-based information of the particular operating system or of any host having access to said at least one segment.

30. An antivirus unit, according to claim 29, wherein said means for coupling includes means for coupling to only one storage device.

31. An antivirus unit, according to claim 29, wherein said means for coupling includes means for coupling to more than one storage device.

32. An antivirus unit, according to claim 29, further comprising:
   means for coupling to at least one host.

33. An antivirus unit, according to claim 32, wherein said antivirus unit is interposed between said at least one storage device and said at least one host.

34. An antivirus unit, according to claim 32, wherein said antivirus unit is implemented as a process running on the at least one host.

35. An antivirus unit, according to claim 29, wherein said antivirus unit is implemented using stand alone hardware.

36. An antivirus unit, according to claim 29, wherein at least a portion of the antivirus unit is provided on at least some controllers for the at least one storage device.

37. The antivirus unit of claim 29, wherein the antivirus unit and a first of said plurality of hosts have access to a same segment and access to said same segment by said first host is denied when said same segment is being accessed the antivirus unit.

38. The antivirus unit of claim 29, wherein the antivirus unit and a first of said plurality of hosts have access to a same segment and the antivirus unit is allowed to perform virus scanning on said same segment while said same segment is being accessed by said first host.

39. The antivirus unit of claim 29, wherein said means for accessing non-native files accesses a portion of said disk space using a logical disk unit, a cylinder number and a track number, and the antivirus unit further comprising:
   means for performing, in accordance with detected write operations, virus scanning on those tracks to which write operations have been directed.

40. An antivirus unit, comprising:
   means for performing a first virus scan at a first time; and
   means for performing a second virus scan at a second time after the first time, wherein for said second virus scan, logical entities having a date of last modification that is after the first time are examined and wherein performing said first and second virus scans includes using a particular operating system and accessing non-native files created using operating systems different from the particular operating system, wherein, when performing a virus scan accessing at least one part of the storage device that is also accessible to at least one host, scanning of said at least one part is performed without using file-based information of the particular operating system or of any host having access to said at least one part
   wherein at least one of said means for performing said first virus scan and said means for performing said second virus scan includes:
   means for detecting write operations to tracks of the storage device; and
   means for performing, in accordance with detected write operations, virus scanning on those tracks to which write operations have been directed.

41. An antivirus unit, according to claim 40, wherein said antivirus unit is implemented using stand alone hardware.

42. An antivirus unit, according to claim 40, wherein at least a portion of the antivirus unit is provided on at least some controllers for the at least one storage device.

43. A method of detecting computer viruses, comprising:
   providing a disk space having at least a portion that is partitioned into separate segments, each segment being accessed by at least one of a plurality of hosts, wherein a first one of the segments is accessed using a different file system than a second one of the segments;
   an antivirus unit, that uses a particular operating system, scanning at least part of the disk space for viruses, wherein the part of the disk space that is scanned by the antivirus unit includes at least some parts of the first and second segments; and
   the antivirus unit accessing non-native files created using operating systems different from the particular operating system that is used by the antivirus unit in connection with scanning at least parts of the disk space for viruses, wherein said antivirus unit scans at least one of the segments without using file-based information of the particular operating system or of any host having access to said at least one segment, wherein the antivirus unit accesses a portion of said disk space using a logical disk unit, a cylinder number and a track number, and the method further comprising:
   detecting write operations to tracks of the device; and
   performing, in accordance with detected write operations, virus scanning on those tracks to which write operations have been directed.

* * * * *